(12) United States Patent
Bahmata et al.

(10) Patent No.: US 10,092,951 B2
(45) Date of Patent: Oct. 9, 2018

(54) UNITARY CALIPER BODY AND SUPPORT BRACKET AND METHOD OF MAKING THE SAME

(71) Applicant: AKEBONO BRAKE INDUSTRY CO., LTD, Chuo-ku, Tokyo (JP)

(72) Inventors: Aurelian Bahmata, South Lyon, MI (US); Brad Lethorn, Northville, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 365 days.

(21) Appl. No.: 14/840,590

(22) Filed: Aug. 31, 2015

(65) Prior Publication Data

US 2017/0056972 A1   Mar. 2, 2017

(51) Int. Cl.
*B22C 9/10* (2006.01)
*B22D 31/00* (2006.01)
*F16D 55/226* (2006.01)

(52) U.S. Cl.
CPC .............. *B22D 31/002* (2013.01); *B22C 9/10* (2013.01); *F16D 55/226* (2013.01); *F16D 2250/0007* (2013.01)

(58) Field of Classification Search
CPC ................................ B22D 31/002; B22C 9/10
See application file for complete search history.

(56) References Cited

U.S. PATENT DOCUMENTS

| 2005/0061466 | A1 | 3/2005 | Morais et al. |
| 2010/0050975 | A1* | 3/2010 | Everwin ............... B22D 18/02 123/193.6 |
| 2012/0043168 | A1* | 2/2012 | Narayanan, V ....... F16D 55/227 188/72.1 |
| 2015/0053363 | A1 | 2/2015 | Jiang et al. |
| 2015/0219171 | A1* | 8/2015 | Kawamata ............ F16D 55/228 188/72.5 |

FOREIGN PATENT DOCUMENTS

| WO | 2013/186055 A2 | 12/2013 |
| WO | WO-2014024313 A1 * | 2/2014 ........... F16D 55/228 |

OTHER PUBLICATIONS

Extended European Search Report; dated Jan. 24, 2017 for European Patent Application No. EP16160731.2.

* cited by examiner

*Primary Examiner* — Kevin P Kerns
*Assistant Examiner* — Steven S Ha
(74) *Attorney, Agent, or Firm* — The Dobrusin Law Firm, P.C.

(57) ABSTRACT

The present teachings provide a method comprising steps of: forming an integral brake caliper body and support bracket that comprises a caliper body and a support bracket; and separating the caliper body from the support bracket.

20 Claims, 3 Drawing Sheets

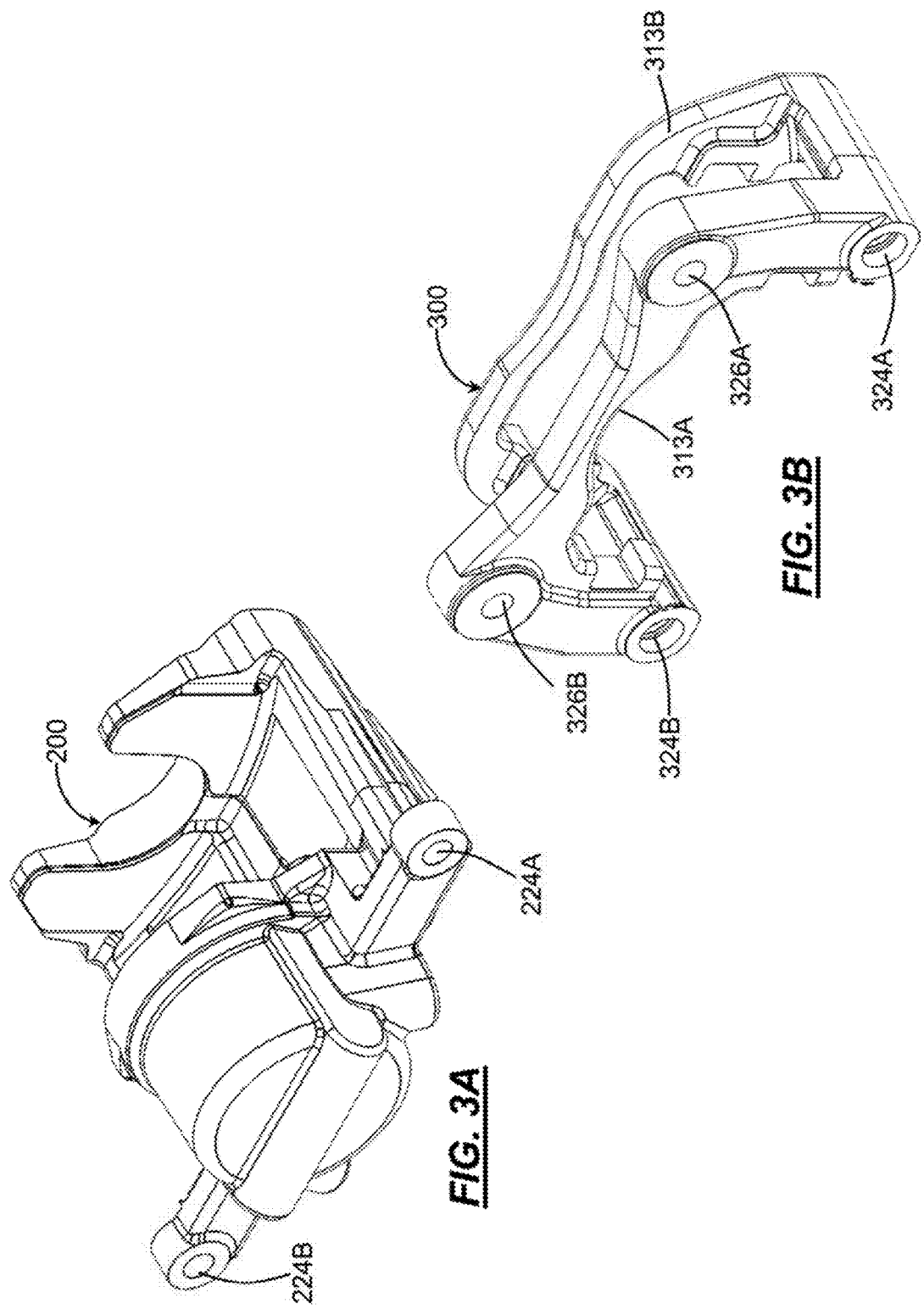

UNITARY CALIPER BODY AND SUPPORT BRACKET AND METHOD OF MAKING THE SAME

FIELD

The present teachings relate generally to components of a disc brake system where the caliper body and support bracket are made as a unitary piece, and a method of making the same.

BACKGROUND

The present teachings are predicated upon providing an improved method of making one or more components of a brake system. Brake systems are used to decelerate and/or maintain in a stopped or parked position a vehicle, such as a car, truck, bus, train, airplane, or the like. Alternatively, brake systems may be used with equipment requiring a brake, such as a lathe, a wind turbine, a winder for paper products or cloth, amusement park rides, or the like.

A typical disc brake system generally includes a brake rotor, a caliper body, a support bracket, an inboard brake pad, and an outboard brake pad. The caliper body generally, includes one or more fingers, and one or more piston bores each supporting a brake piston. During a brake apply, fluid is pressurized causing at least one of the brake pistons to move the inboard brake pad towards a side of the brake rotor. Simultaneously, or slightly thereafter, either the one or more fingers pull or another brake piston pushes the outboard brake pad towards an opposing side of the brake rotor. In this regard, both the inboard and outboard brake pads are forced against the brake rotor to create a friction force that is sufficient to reduce the rotational speed of the brake rotor. Accordingly, the vehicle can be decelerated and/or maintained in a stopped or parked position.

Typically, one or more components of the disc brake system are made via a casting process, and, typically, the components are cast individually. That is, for example, the caliper bodies are usually cast on a dedicated caliper body casting line using one set of dedicated tools, and the support brackets are usually cast on another dedicated support bracket casting line using another set of dedicated tools. The cast caliper bodies are then trimmed and cleaned, and excess cast material is removed, all of which takes places on a dedicated caliper body trimming line. Likewise, after casting, the support brackets are trimmed and cleaned, and excess cast material is removed, all of which takes places on a dedicated support bracket trimming line. After cleaning the caliper body and the support bracket are machined and controlled on separate lines, with separate setups, and separate tools and fixtures. During each of the machining operations, one or more corresponding features, such as pin bores for example, are machined in the caliper body and in the support bracket for assembling the caliper body and support bracket.

After the respective machining operations, the caliper bodies and support brackets are assembled along with other components into a brake system. However, as a result of separate marching operations, variations in the machining processes may make assembly difficult, or affect performance of the brake system in a negative way. For example, if the bores or other corresponding features in the caliper body and support bracket are not properly aligned, it may be difficult to assemble the caliper body and support bracket. Accordingly, one or both of the caliper body and the support bracket may need to be reworked or, undesirably, scrapped, which may disrupt the assembly process and add additional time and cost to the process. While increasing the tolerance limits of these features may help ensure that these components fit together during assembly, larger tolerance limits may adversely effect performance during functioning. For example, increased tolerance limits may cause movement of the components, which may undesirably result in disc thickness variation (DTV), brake torque variation (BTV), high noise levels, or other effects. Such movement may also undesirably reduce the life of the brake pads, the brake rotor, or both, and may have an adverse effect on fuel efficiency of the vehicle.

Accordingly, it may be desirable to have components for a brake system with corresponding features, such as pin bores having an improved alignment, and a method of making the same. It may be attractive to have a method of casting two or more components of a brake system using one set of casting tools (e.g., patterns, core boxes, etc.). It may be desirable to have a method of casting a caliper body and a support bracket using a single core. It may be desirable to have a method of making a caliper body and support bracket, where the parts are cast together, and then together trimmed and machined. Accordingly, the number of tools and the number of operations required to create the caliper body and the support bracket may thus be reduced; the pin bores in the caliper body and the corresponding bores in support bracket may be better aligned; or both. It may be attractive to have a method of making a caliper body and support bracket where variations in the concentricity of the bores in the caliper body and in the support bracket are reduced so that assembly of the caliper body and support bracket can be improved and thus scrap and/or components requiring reworking can be reduced. It may be attractive to have a method where the dimensional relationships between functional features in the caliper body and the support bracket are tightly controlled by machining the two components together as one piece.

SUMMARY

The present teachings provide improved braking components and a method of making one or more components of a brake system. The teachings herein provide a method of making two or more components of a brake system using one set of casting tools. The teachings herein provide a method of casting a caliper body and a support bracket using a single core. The caliper body and the support bracket may be cast together with a single core, in a single tool, in a single line, or a combination thereof. The present teachings provide a method of making a caliper body and support bracket, where the parts are cast together, and then trimmed, cleaned and machined together, thus reducing the number of tools and operations required to make the caliper body and support bracket. The present teachings provide a method of making a caliper body and support bracket, where the parts are cast together, and then functional features such as bores and others in the caliper body and the support bracket are machined before the caliper body and the support bracket are separated. Accordingly, the functional features in both components are either aligned or there is a corresponding relationship between them. Accordingly, less set up time is required to machine the bores in the caliper body and in the support bracket.

The teachings herein provide a method of making a caliper body and support bracket where variations in the concentricity of bores in the caliper body and corresponding bores in the support bracket are reduced so that assembly and functionality of the caliper body and support bracket can be improved.

The present teachings provide a core for making components of a brake system. The core can be used to make a single piece caliper body and support bracket. The core can be used with a mold that includes a cope and a drag, a swing and a ram, or a combination thereof, for example, to form an integral caliper body and support bracket. Once formed, the integral caliper body and support bracket can be subject to one or more trimming and/or machining operations for providing one or more corresponding bores in the caliper body and the support bracket. Preferably, the caliper body and the support bracket are separated after a step of providing the one or more bores in the caliper body and support bracket.

The present teachings provide a method of making at least two components of a brake system, at the same time. The components of the brake system can be cast. The components may be for any brake system, such as a drum brake system, an opposing brake system, a disc brake system, etc. Preferably, the components include a caliper body and a support bracket for a disc brake system.

The caliper body and the support bracket can be made using one set of tools. Preferably, the caliper body and the support bracket are cast using one set of tools each having at least one core. Preferably, after casting and trimming, the caliper body and the support bracket are a single, integral piece. Preferably, after being made, the caliper body and the support bracket are one continuous, unitary, piece, connected in one or more places. After the caliper body and the support bracket are integrally formed, one or more bores may be formed there through. Preferably, one or more corresponding bores are made in one operation in the caliper body and support bracket. Preferably, after the caliper body and the support bracket are separated, the corresponding bores in each component are generally aligned and/or extend along a common axis.

The present teachings provide a method comprising the steps of: forming an integral brake caliper body and support bracket; and separating the caliper body from the support bracket. The integral brake caliper body and support bracket comprises a caliper body and a support bracket.

The present teachings also provide a method of forming a caliper body and a support bracket, comprising steps of: providing a core and forming the caliper body and the support bracket with the core in a casting process. The core includes a piston projection for forming a piston bore in the caliper body, and a base for forming a gap between arms of the support bracket. After the casting process, the support bracket is integrally formed with the caliper body.

The present teachings further provide a core including one or more piston projections for forming one or more piston bores in a caliper body, and a base for forming a gap between arms of a support bracket. The core is part of a mold for forming the integral brake caliper body and support bracket according to the teachings herein.

BRIEF DESCRIPTION OF THE DRAWINGS

FIG. 3A is a perspective view of the caliper body.

FIG. 3B is a perspective view of the support bracket.

DETAILED DESCRIPTION

Figure 1A:
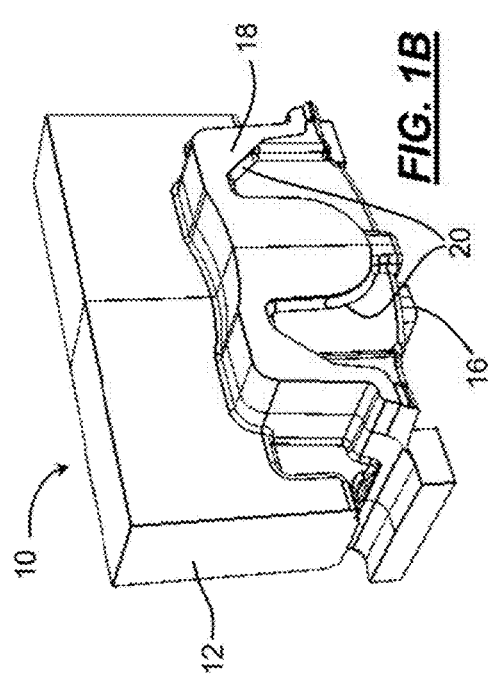
FIG. 1A is a perspective view of a core for a one piston caliper.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide components of a brake system. The present teachings provide a method of making components for a brake system. The brake system can be any brake system. The brake system may decelerate and/or maintain a vehicle in a stopped or parked position. The vehicle may be any vehicle, such as a car, truck, bus, train, airplane, or the like, for example. Alternatively, the brake system may be used with equipment requiring a brake system. Exemplary equipment may include a lathe, a wind turbine, a winder for paper products or cloth, amusement park rides, or the like. Preferably, the brake system is used with a vehicle. The brake system can be any brake system. For example, the brake system can be a drum brake system, an opposing brake system, a disc brake system, etc. Preferably, the brake system is a disc brake system. Virtually any of the components of the brake system, the disc brake system, or both can be made using the teachings herein. A typical disc brake system generally includes a brake rotor, a caliper body, a support bracket, and a pair of brake pads. Preferably, a caliper body and a support bracket can be made according the teachings herein.

The brake system may include one or more caliper bodies. The caliper body may function to support one or more components of the brake system. The caliper body may provide for the movement of one or more brake pads, or, preferably, two or more brake pads relative to the brake rotor. During a brake apply, the caliper body may move relative to the support bracket (i.e., a floating caliper), or the caliper body may be fixed so that the brake caliper does not move (i.e., a fixed caliper).

The caliper body may include one or more piston bores. The one or more piston bores may be one or more hollow regions in the caliper body. Each of the one or more piston bores may support a corresponding brake piston. The one or more piston bores may be any shape. Preferably, the shape of the one or more piston bores corresponds generally to the shape of a corresponding brake piston. Preferably, the one or more piston bores are cylindrically-shaped. The one or more piston bores may be located on an inboard side of the brake rotor, an outboard side of the brake rotor, or both.

The caliper body may include one or more bores. The one or more bores may function to connect together the caliper body and the support bracket using other components such as pins or bolts. The one or more bores may be pin bores. The one or more bores may be formed in any portion of the caliper body. Preferably, the one or more bores are formed in one or more ears of the caliper body. Each of the one or more bores may function to receive a pin. The pin may also extend through one or more corresponding bores in the support bracket so that the caliper body, the support bracket, or both can move or translate about or along the pin. The pin may connect the caliper body and a corresponding support bracket. Preferably, the one or more bores in the caliper body correspond to the one or more bores in the support bracket, and are generally aligned therewith.. Preferably, the one or more corresponding bores in the caliper body and the support bracket extend along common axis. The caliper body may include any number of bores. For example, the caliper body can include one or more bores, or preferably two or more bores. The caliper body may include four or fewer bores, three or fewer bores, or preferably two or fewer bores. Preferably, the caliper body includes two bores, and the support bracket includes two corresponding bores.

The caliper body may include one or more fingers. During a brake apply, the one or more fingers may function to move an outboard brake pad towards an outboard side of the brake rotor. Alternatively, during a brake apply, one or more brake pistons may function to move an outboard brake pad towards an outboard side of the brake rotor. The one or more fingers may extend from a bridge portion of the caliper body. The one or more fingers may include any suitable number of fingers. The number of fingers may depend on the size of the one or more brake pads. For example, the larger the brake pad, the more fingers the caliper body may have. For example, the caliper body can have one or more fingers, or preferably two or more fingers. The caliper body may include four or fewer fingers, three or fewer fingers, or preferably two or fewer fingers.

The brake system may include one or more support brackets. The support bracket may function to engage and/or support one or more brake pads. The support bracket may include one or more arms Each of the one or more arms may function to support a corresponding brake pad. Preferably, the support bracket includes two arms. Preferably, one arm supports an inboard brake pad, and another arm supports an outboard brake pad. Each arm may be separated by a gap. Preferably, each arm includes a pair of notches, cutouts, and/or grooves. The notches, cutouts, or grooves may function to receive the ends or ears of a corresponding brake pad. The notches, cutouts, or grooves may function to receive a pad clip, which may be located between the ends or ears of a brake pad and the support brackets, The support bracket may include one or more bores. The one or more bores may function to connect together the support bracket and the caliper body. Each of the one or more bores may function to receive a pin. The pin may also extend through corresponding bores in the caliper body so that the support bracket, the caliper body, or both can move or translate about the pins. Preferably, the one or more bores in the support bracket correspond to the one or more bores in the caliper body, and are generally aligned therewith. Preferably, the one or more corresponding bores in the support bracket and the caliper body extend along common axis. The support bracket may include any number of bores. For example, the support bracket can include one or more bores, or preferably two or more bores. The support bracket may include four or fewer bores, three or fewer bores, or preferably two or fewer bores. Preferably, the support bracket includes two bores, and the caliper body includes two corresponding bores.

The support bracket may include one or more mounting bores. The one or more mounting bores may function to connect a brake caliper assembly (e.g., the caliper body, the support bracket, the brake pads, etc.) to a knuckle or a support structure of a vehicle. The one or more mounting bores may be located in one of the arms, or both of the arms. The support bracket may include any number of mounting bores. For example, the support bracket can include one or more mounting bores or preferably two or more mounting bores. The support bracket may include four or less mounting bores, three or less mounting bores, or preferably two or less mounting bores. Preferably, the support bracket includes two mounting bores.

The caliper body and the support bracket may be made from an integral brake caliper body and support bracket. Preferably, the integral brake caliper body and support bracket comprises one or more caliper bodies and one or more support brackets. Preferably, the integral brake caliper body and support bracket comprises of an integral caliper body and support bracket that is one continuous piece. Before separating, the caliper body and the support bracket can be formed or attached together at any suitable location. For example, the support bracket can be formed or attached to the caliper body at the one or more fingers, the bridge portion, the one or more ears, the piston bore, an outer surface of the piston bore, or any other suitable location. Preferably, the support bracket is attached to one or more of the ears of the caliper body. Preferably, the support bracket is attached to both ears of the caliper body, A tool or mold may be used to make, create and/or form the integral brake caliper. The tool may include one or more parts so that a molten material can be added thereto and the integral brake caliper body and support bracket can be produced. Preferably, the tool includes two mold cakes (Le., a first mold cake and a second mold cake). The first mold cake and the second mold cake may be used as vertical molds, horizontal molds, or both. The mold cakes may be vertically oriented, horizontally oriented, or both. The mold cakes may be a drag mold cake and a cope mold cake. The mold cakes may be a swing mold cake and a ram mold cake. Preferably, the tool includes one or more cores according to the teachings herein located between the two mold cakes so that the integral brake caliper and support bracket discussed herein is produced. The two mold cakes may be configured, relative to each other, in any manner so that tool is formed and the integral brake caliper and support bracket can be produced. The tool may be a flaskless mold. The mold cakes may include two sides. For example, if a mold cake is sandwiched between two adjoining mold cakes, a tool will be formed on each side of the mold cake. In another example, each mold cake may have two sides so that molds may be continuously formed by moving a second mold cake adjacent to a first mold cake, and a forward surface (i.e., swing side) the second mold cake completes a mold with the second side (i.e., ram side) of the first mold cake and then when a third mold cake is moved into position the second side (i.e., ram side) of the second mold cake forms half of a new mold with the third mold cake.

The mold cakes, the core, or both may be made of sand and binder. The mold cakes, the core, or both may be made of any material that may withstand molten material without degrading. The mold cakes, core, or both may be made of any material that may withstand a temperature of about 500° C. or more, about 700° C. or more, about 1100° C. or even 1500° C. or more without losing its shape, form, structural integrity or a combination thereof. The mold cakes, core, or both may be made of any material so that when vigorously vibrated the mold cakes, core, or both break apart so that the resulting structure can be released from tool. The mold cakes, core, or both may be made of any materials so that when placed in a solvent (e.g., water) the binder dissolves and releases the resulting structure. The mold cakes, core, or both may be formed separately. The mold cakes, core, or both may be formed and then combined to form a tool.

One or more cores may be used to produce one or more features of the integral brake caliper body and support bracket, the caliper body, the support bracket, or a combination thereof. The one or more cores may function to produce features that may be difficult or cannot otherwise be produced with the other parts of the tool. The core may have a configuration so that when placed between the two mold cakes molten material can fill and surround the core and form one or more features of the integral brake caliper body and support bracket discussed herein. The core may have one or more vents for releasing of air or gas during filling of the mold or tool. Once the molten material is solidified the core may be removed and the integral brake caliper body and support bracket will include the structure described herein.

The one or more cores may include one or more features that are opposite or negatives of features of the integral brake caliper body and support bracket, the caliper body, the support bracket, or a combination thereof. The features may be formed on one or more planes or surfaces of the core. The features may include a draft angle. The draft angle may be any angle so that the core may be created in a core box, removed from the core box, and used to mold the integral brake caliper body and support bracket discussed herein. The draft angle may be about 3 degrees or less, about 2 degrees or less, or about 1 degree or less The draft angle may be between about 0.5 degrees and 5 degrees, preferably between about 0.5 degrees and 3 degrees, or more preferably between about 1 degree and about 2 degrees.

The one or more cores may be fabricated from any suitable material. Preferably, the one or more cores are not damaged during the casting process. More specifically, the one or more cores are preferably not damaged when a molten material is introduced into the tool. Preferably, the one or more cores can be removed from the tool after the molten material solidifies. The one or more cores may be destructively removed after the molten material solidifies or removed without destroying the core.

The one or more cores may include one or more features that are piston projections. The one or more piston projections may have a size and shape that generally corresponds to, but are generally opposite, or are negatives of, the one or more piston bores of the caliper body.

The one or more cores may include one or more features that are base portions. The one or more base portions may have a size and shape that generally corresponds to, but is generally opposite, or is a negative of, the gap between the arms of the support bracket.

The one or more cores may include one or more features that are window projections. The one or more window projections may have a size and shape that generally corresponds to, but is generally opposite, or is a negative of, the window of the caliper body.

The one or more cores may include one or more features that are a second base portion. The second base portion may have a size and shape that generally corresponds to, but is generally opposite, or is a negative of, the gap extending between one of the arms of the support bracket and the one or more fingers of the caliper body, The caliper body and the support bracket may be made with a method or process. The method may include one or more of the following steps, which may be performed in virtually any suitable order. While the following method is described as producing a single integral brake caliper body and support bracket, it is understood that more than one integral brake caliper bodies and support brackets can be formed. The method may include a step of forming one or more mold cakes, one or more cores, or both. The method may include a step of placing the one or more cores between the mold cakes to form a complete tool. The method may include a step of adding a molten material to the tool. The molten material may be any suitable material for making components of a brake system. For example, the molten material may be aluminum, aluminum alloy, cast iron, graphite cast iron, steel, the like, or a combination thereof. The method may include a step of adding enough molten material so that the molten material substantially surrounds the one or more cores. The method may include a step of filing the mold or tool with a sufficient amount of material to form one or more of the integral brake caliper bodies and support brackets. The method may include a step of setting the molten material, cooling the molten material, hardening the molten material, or a combination thereof. The method may include a step of removing the one or more solidified integral brake caliper bodies and support brackets from the tool. The one or more solidified integral brake caliper bodies and support brackets may be removed from the tool by vibrating, agitating, dissolving, breaking apart, pulverizing, or a combination thereof so that the integral brake caliper body and support bracket is released from the tool. The tool may be placed in a solution bath so that the binder dissolves and the integral brake caliper body and support bracket is released therefrom. The method may include a step of tumbling or shot blasting the integral brake caliper body and support bracket after solidification to remove any surface imperfections, for example.

The method may include a step of providing one or more bores in the integral brake caliper body and support bracket. The one or more bores may be made in the integral brake caliper body and support bracket such that the bores extend into and/or through both the caliper body and support bracket. The one or more bores may be made in a single action in the integral brake caliper body and support bracket so that after the caliper body and support bracket are separated, one or more bores are formed in the caliper body and one or more corresponding bores are formed in support bracket in a single action. Preferably, after the support bracket and the caliper body are separated from the integral component, from one another, or both, the corresponding one or more bores are substantially aligned and extend along a corresponding axis.

The method may include a step of providing one or more mounting bores in the integral brake caliper body, the support bracket or both. The mounting bores may be formed before or after the support bracket is separated from the integral brake caliper body and support bracket. Alternatively, the one or more mounting bores can be provided in the support bracket portion during the same set up as when the one or more bores are provided in the integral brake caliper body and support bracket.

Figure 1B:
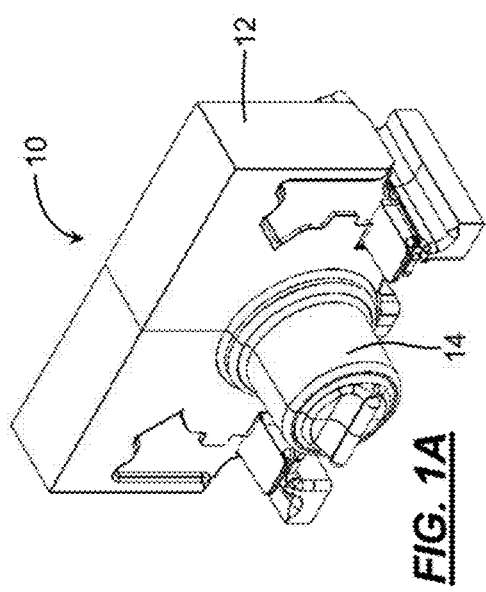
FIG. 1B is a perspective view of the core.

The method or process may include a step of separating the caliper body, the support bracket, or both from the integral brake caliper body and support bracket. Preferably, the support bracket is separated from the caliper body, or vice versa. The support bracket can be separated from the caliper body (or vice versa) using any suitable method. For example, the support bracket can be machined, cut, agitated, or otherwise separated from the caliper body, or vice versa. The method may include a step of separating one or more spruces, gates, or both from the integral brake caliper body and support bracket, the caliper body, the support bracket, or both, FIGS. 1A and 1B each illustrate a core 10. The core 10 can be used to form the integral brake caliper body and support bracket 110 shown in FIGS. 2A and 2B. The core 10 is placed between a swing or cope 30 and ram or drag 40 thereby forming a complete mold 50 schematically shown in FIG. 5. The complete mold 50 receives molten material to create the integral brake caliper body and support bracket 110.

Figure 2A:
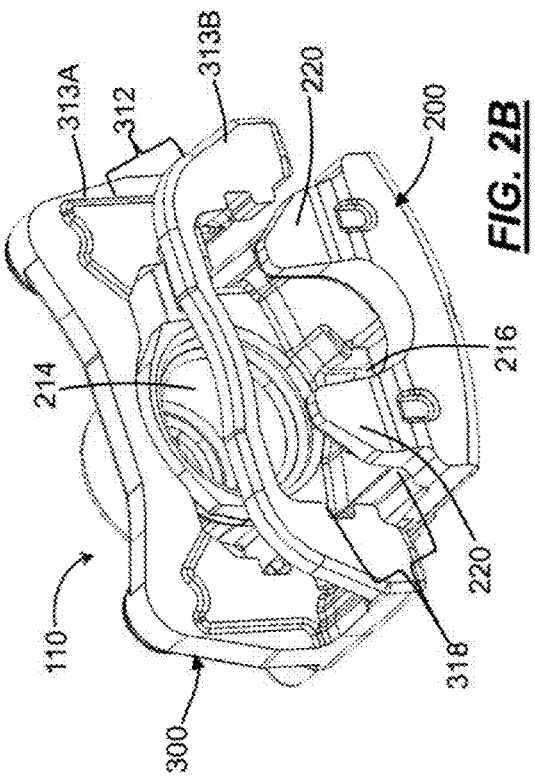
FIG. 2A is a perspective view of the integral brake caliper body and support bracket.
Figure 2B:
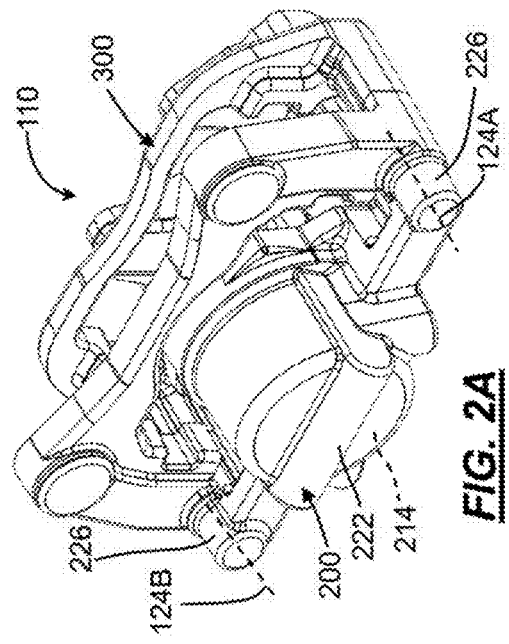
FIG. 2B is a perspective view of the integral brake caliper body and support bracket.

FIGS. 2A and 2B illustrate the integral brake caliper body and support bracket 110. The integral brake caliper body and support bracket 110 comprises a caliper body 200 and support bracket 300.

With reference to FIGS. 1A-2B, the core 10 includes a base portion 12 for forming a gap 312 between the arms 313A, 313B of the support bracket 300. The core 10 includes a piston projection 14 for forming a piston bore 214 in the caliper body 200. The core 10 includes a window projection 16 for forming a window 216 in the caliper body 200. The core 10 includes another base portion 18 for forming a gap 318 between the arm 313B of the support bracket 300 and the fingers 220 of the caliper body 200. The core includes cutouts 20 for forming the fingers 220 of the caliper body 200.

Figure 5:
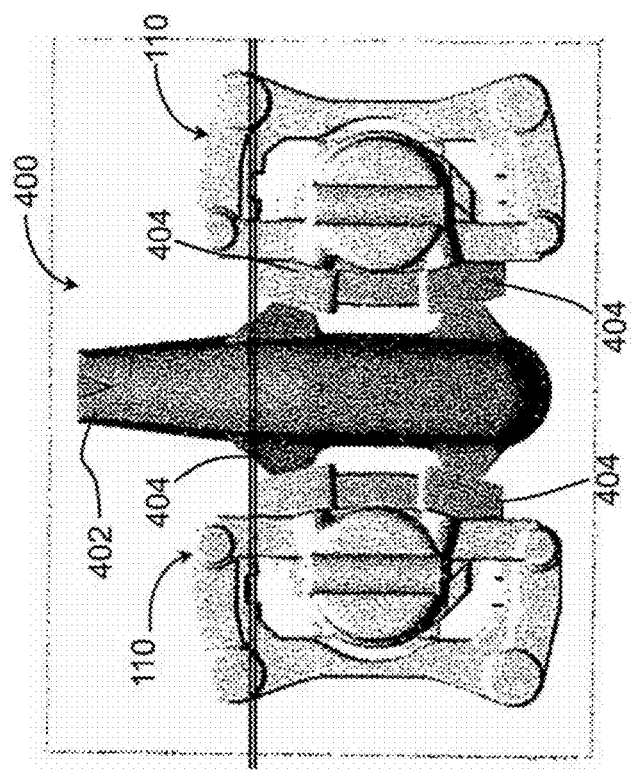
FIG. 5 is a schematic view of the core in a mold.

The core 10 can be placed into the mold 50 shown in FIG. 5 that a swing or cope 30 and ram or drag 40. While not illustrated, it is understood that the mold 50, the swing or cope 30 and/or the ram or drag 40 can include additional features for forming one or more potions of the integral brake caliper body and support bracket 110, the caliper body 200, the support bracket 300, or a combination thereof. For example, the mold 50, the swing or cope 30 and/or the ram or drag 40 can include features that may cooperate with the core 10 for forming the projection 222 located on an outer surface of the piston bore 214 and the outer surfaces of the arms 313A, 313B of the support bracket 300.

After the integral brake caliper body and support bracket 110 is formed, the caliper body 200 and the support bracket 300 are attached together at a suitable location. For example, support bracket 300 are attached to the ears 226 of the caliper body 200. Preferably, before separating the caliper body 200 and the support bracket 300, bores can be made in the ears 226 and through a portion of the support bracket 300. The bores can be made generally along each of the axis 124A and 124B.

With additional reference to FIGS. 3A and 3B, after the bores are made generally along each of the axis 124A and 124B, and after the caliper body 200 and the support bracket 300 are separated, bores 224A, 224B are formed in the caliper body 200 and corresponding bores 324A, 324B are formed in the support bracket 300. Preferably, the corresponding bores 224A, 324A and 224B, 324B are generally aligned and concentric. Additional mounting bores 326A, 326B can be made in the support bracket 300 before or after the caliper body 200 and the support bracket 300 are separated.

Figure 4:
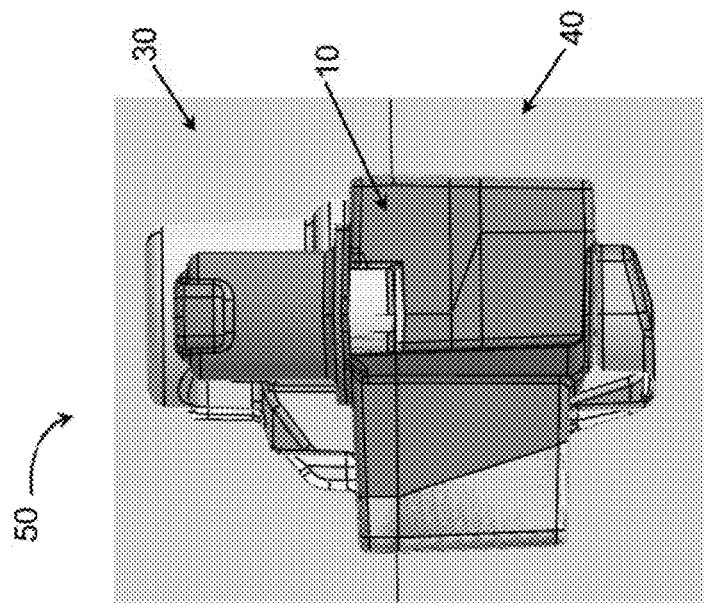
FIG. 4 is a front view of a pair of cast integral brake caliper bodies and support brackets.

FIG. 4 illustrates a post-formed integral brake caliper body and support bracket 400, which comprises a pair of attached integral brake caliper body and support brackets 110. The post-formed integral brake caliper body and support bracket 400 can be formed by placing two corresponding cores (not illustrated) into the tool and can formed in substantially the same way that the single integral brake caliper body and support bracket 110 is formed. Alternatively, a single core having features for forming the integral brake caliper body and support bracket 400 can be placed into the tool. The post-formed integral brake caliper body and support bracket 400 includes a sprue 402 and a plurality of gates 404. The gates 404 can be attached to any suitable location to one or both of the integral brake caliper body and support brackets 110. The molten material can flow into the mold 50 (FIG. 5) via the sprue 402 and then fill a location in the mold 50 corresponding to each of the integral brake caliper body and support brackets 110 via the gates 404. The sprue 402, the gates 404, or both can be separated from one or both of the caliper body and support brackets 110 before, during, or after one or more of the bores, the mounting bores, or a combination thereof are formed; before during or after the caliper body 200 and support bracket 300 are separated; or a combination thereof.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "x parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The ten "consisting essentially of" to describe a combination shall include the elements, ingredients, components or steps identified, and such other elements ingredients, components or steps that do not materially affect the basic and novel characteristics of the combination. The use of the terms "comprising" or including to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A method comprising steps of:
   forming an integral brake caliper body and support bracket that comprises a caliper body and a support bracket with a core that has at least one feature for forming at least one feature of the integral brake caliper body and support bracket, the caliper body, the support bracket, or a combination thereof; and
   separating the caliper body from the support bracket;
   wherein the core includes a base portion for forming a gap between a pair of arms of the support bracket.

2. The method of claim 1, wherein before the separating step, the method includes a step of:
   providing at least one bore in the integral brake caliper body and support bracket so that at least one bore is fanned in the caliper body and a corresponding at least one bore is formed in the support bracket in one action.

3. The method of claim 1, wherein the core includes a window projection for forming a window in the caliper body.

4. The method of claim 1, wherein the core includes a second base portion for forming a gap between an arm of the support bracket and one or more fingers of the caliper body.

5. The method of claim 1, wherein the core includes cutouts for forming one or more fingers of the caliper body.

6. The method of claim 1, wherein one or more mounting bores are formed in the support bracket during the forming step and before the separating step.

7. The method of claim 1, wherein the support bracket is attached to one or more ears of the caliper body before the separating step.

8. The method of claim 1, wherein the core is placed between a cope and a drag to form a complete tool, and
   wherein the integral brake caliper body and support bracket are formed via a casting process.

9. A method comprising steps of:
   forming an integral brake caliper body and support bracket that comprises a caliper body and a support bracket with a core that has at least one feature for forming at least one feature of the integral brake caliper body and support bracket, the caliper body, the support bracket, or a combination thereof;
   wherein the at least one feature of the core base portion for forming a gap that is defined between an arm of the support bracket and one or more fingers of the caliper body.

10. The method of claim 9, wherein the at least one feature of the core is a window projection for forming a window in the caliper body.

11. The method of claim 9. wherein the at least one feature of the core is a second base portion for forming a gap between a pair of arms of the support bracket.

12. The method of claim 9, wherein the at least one feature of the core is cutouts for forming the one or more fingers.

13. The method of claim 9, wherein the method comprises a step of:
    providing a single bore in the integral brake caliper body and support bracket that extends into both of the caliper body and the support bracket in one single action.

14. The method of claim 9, wherein the method comprises a step of:
    separating the caliper body from the support bracket.

15. A method comprising steps of:
    forming an integral brake caliper body and support bracket that comprises a caliper body and a support bracket with a core that has features for forming at least one feature of the integral brake caliper body and support bracket, the caliper body, the support bracket, or a combination thereof; and
    separating the caliper body from the support bracket;
    wherein the core features comprise cutouts for forming one or more fingers of the caliper body.

16. The method of claim 15, wherein the core features include a window projection for forming a window in the caliper body.

17. The method of claim 16, wherein the core features include a base portion for forming a gap between a pair of arms of the support bracket, and the core features also include a piston projection for forming a piston bore in the caliper body.

18. The method of claim 17, wherein the core features include a second base portion for forming a gap between an arm of the support bracket and the one or more of the fingers.

19. The method of claim 18, wherein the method comprises a step of:
    providing a single bore in the integral brake caliper body and support bracket that extends into both of the caliper body and the support bracket in one single action.

20. The method of claim 19, wherein the separating step is after the step of providing the single bore in the integral brake caliper body and support bracket.

* * * * *

UNITED STATES PATENT AND TRADEMARK OFFICE
CERTIFICATE OF CORRECTION

PATENT NO. : 10,092,951 B2
APPLICATION NO. : 14/840590
DATED : October 9, 2018
INVENTOR(S) : Bahmata et al.

Page 1 of 1

It is certified that error appears in the above-identified patent and that said Letters Patent is hereby corrected as shown below:

In the Claims

Column 11, Line 34:
Delete "fanned" and insert therein --formed--

Column 12, Line 5:
Insert --is a-- before "base portion"

Signed and Sealed this
Thirteenth Day of November, 2018

Andrei Iancu
*Director of the United States Patent and Trademark Office*